United States Patent [19]

Sohn et al.

[11] 3,852,579

[45] Dec. 3, 1974

[54] METHOD AND APPARATUS FOR DETERMINING THE SURFACE CONFIGURATION OF ELONGATE OBJECTS, PARTICULARLY LOGS

[75] Inventors: Fred Sohn, Roseburg; Larry C. Hunter; James Frederick Holmes, both of Corvallis, all of Oreg.

[73] Assignee: Sun Studs, Inc., Roseburg, Oreg.

[22] Filed: Mar. 23, 1973

[21] Appl. No.: 344,175

[52] U.S. Cl. .............. 235/151.3, 144/309, 356/150, 356/160
[51] Int. Cl. ......................................... G01b 11/10
[58] Field of Search................... 144/309, 209, 312; 356/150, 167, 159, 160; 250/219; 235/151.3

[56] References Cited
UNITED STATES PATENTS

| | | | |
|---|---|---|---|
| 3,513,321 | 5/1970 | Sherman | 356/160 X |
| 3,698,818 | 10/1972 | Bowker et al. | 356/160 |
| 3,712,741 | 1/1973 | Revert | 356/160 |
| 3,724,958 | 4/1973 | Callan | 356/160 |
| 3,746,065 | 7/1973 | Mason | 144/309 |
| 3,749,499 | 7/1973 | Reichard et al. | 356/150 |

Primary Examiner—Malcolm A. Morrison
Assistant Examiner—Edward J. Wise
Attorney, Agent, or Firm—Chernoff & Vilhauer

[57] ABSTRACT

An apparatus and method for determining the surface configuration of a log prior to its peeling into veneer. An electro-optical ranging system determines the circumferential contour of the log at a plurality of spaced locations along its length while the log is rotated by a charger mechanism. The ranging system determines, for a plurality of points about the periphery of each log cross-sectional location, the distance of the surface from a predetermined point, typically the spin axis about which the log is rotated while its surface contour is determined. Data developed by the ranging sysem is transferred to a computer at fixed increments of angular rotation of the log. The computer processes this data to calculate the distance from the spin axis to the log surface at each angular increment so as to determine the surface contour of the log at each of the cross-sectional locations. The computer then determines the optimum spin axis of the log for peeling into veneer and controls the operation of the charger mechanism to deliver the log into the chunks of a veneer lathe aligned so as to be rotated about its optimum spin axis.

13 Claims, 5 Drawing Figures

PATENTED DEC 31 1974　　　　　　　　　　　3,852,579

METHOD AND APPARATUS FOR DETERMINING THE SURFACE CONFIGURATION OF ELONGATE OBJECTS, PARTICULARLY LOGS

BACKGROUND OF THE INVENTION

This invention is directed to an apparatus and method for determining the surface configuration of an elongate object by measuring its surface contour at a number of spaced locations along its length while it is rotated about a longitudinal axis. More particularly, the invention is directed to an apparatus and method for determining the optimum spin axis of a log for processing into veneer and thereafter delivering the log into the veneer lathe aligned so as to be rotated about said optimum spin axis.

Log scanning systems are known in the prior art for determining the two-dimensional plane profile of a log utilizing an array of photodetectors responsive to transmitted light radiation which is blocked out by the interposed log body, such as shown for example in Ottoson U.S. Pat. No. 3,459,246, Bowker et al. U.S. Pat. No. 2,698,818 and Bostrom U.S. Pat. No. 3,615,139. The present invention utilizes a series of optical ranging devices to determine the configuration of the log by measuring the distance to the log surface at a plurality of cross-sections spaced along the log length as the log is rotated. The information thus developed by the optical ranging devices regarding the respective circumferential profiles or contours of the log is then supplied to a computer for determining the optimum spin axis of the log when rotated in a veneer lathe for maximizing the yield of usable veneer therefrom.

In the processing of logs into veneer strip, as practiced today in the forest products industry, standard-length log blocks are picked up by the arms of a charger mechanism which, under the manual control of an operator, loads the log into the chucks of a veneer lathe for peeling into veneer strip. As the alignment of the charger arms is done visually the determination of the optimum spin axis for the log is only approximated, and consequently substantial errors are made by the operator in locating the optimum spin axis for rotation of the log in the lathe which will maximize the yield of usable veneer therefrom. As log configurations vary substantially, it is not possible for a human operator to determine, to any great degree of accuracy, the optimum spin axis for each log, especially so when it is recognized that in some industrial plants as many as six logs a minute are processed at a single veneer lathe station. The errors introduced in location of the spin axis of the log result in correspondingly significant reductions in wood yield. Accordingly, if an accurate, automated means were available for speedily determining the optimum spin axis of a log prior to processing, then significant increases could be effected in veneer yield with attendant savings in production costs and conservation of timber resources. In fact, analytical studies which have been made indicate that an error of only one-half of an inch in the location of the spin axis relative to the optimum axis for a given log (the optimum spin axis being defined as the center of rotation of the largest right cylinder which can be enclosed within the log body) will produce a loss in usable veneer of approximately 13 percent for logs of 8 inch radius, or 4 percent for logs of 24 inch radius. Even an error as small as one-tenth of an inch in locating the spin axis will produce veneer loss of almost 3 percent for an 8 inch log.

SUMMARY OF THE INVENTION

The present invention is directed to an apparatus and method for determining the surface configuration of a log, the data provided therefrom being processed by a computer to determine on an on-line basis the optumum spin axis of the log for loading into a veneer lathe so as to maximize the yield of usable veneer therefrom. A ranging system is utilized to determine the configuration of the log and comprises a plurality of distance measuring means spaced along the length of the log. The distance measuring means utilizes the phase shift between transmitted and reflected light radiation to determine the time lag for propagation thereof and thus the distance from a fixed reference point to a point of reflection on the surface of the log. The log is rotated under the light sources so that a plurality of data points concerning the contour of the log at the respective cross-sectional locations are developed by the ranging system. The computer processes this data to determine the overall surface configuration of the log and from that to ascertain the optimum spin axis for peeling of the log in the veneer lathe.

Each of the distance measuring devices in the ranging system comprises, in a preferred embodiment, a light radiation source which is amplitude modulated with a single sideband output produced by the mixture of a first, lower frequency $f_1$ in the audio range and a second, higher frequency $f_2$ in the radio-frequency range. This modulated light radiation, in the form of a narrow beam, is directed substantially normally against the generally cylindrical surface of the log block while it is held by the arms of a charger mechanism and rotated. The light reflected from the surface of the log is detected by a photoelectric transducer and converted into an electrical signal whose phase is compared to that of the transmitted signal to determine the time delay required for the propagation of the radiation from the light source to the detector. From this information the distance from the spin axis of the log to the point on the surface at which the light radiation is incident can be calculated, and measurements of a plurality of such points on the periphery as the log is rotated beneath the light source is then integrated with measurements of the surface contours taken by similar distance measuring devices at other cross-sectional locations along the length of the log to determine its overall configuration.

The two-frequency modulation scheme employed in the distance measuring means improves the resolution of the system in determining the phase difference between the transmitted and received signals by a factor equal to the ratio of the upper and lower modulation frequencies, $f_2/f_1$. Thus, in a practical situation, where the maximum variation in the distance traveled by the light radiation from the source to the detector due to differences in log contour from a low point to a high point may be on the order of 25 to 50 centimeters, it is feasible through the selection of suitable modulation frequencies for $f_1$ and $f_2$ to obtain, with the ranging system of the present invention, an accuracy and resolution in locating points on the surface of the object on the order of 0.5 centimeters, representing a time difference, $\Delta t$, in the transmitted and reflected waves of only 0.033 nanoseconds.

The received single sideband modulated frequency signal is mixed in a phase detector system with the upper modulation frequency $f_2$, and the difference frequency signal produced, $f_3$, has the same frequency as the lower modulation frequency $f_1$. The phase shift between the resultant difference frequency $f_3$ and the lower modulation frequency signal $f_1$ is determined in a digital comparator circuit which produces a pulse count representative of the phase shift or time delay between the transmitted and received signals. (Because of the enhancement in time resolution produced by the use of the two-frequency modulation scheme, the time delay existing between the difference frequency signal $f_3$ and the lower modulation frequency signal $f_1$ is approximately $f_2/f_1$ times the time delay between the transmitted and received signals.)

For synchronization purposes a single oscillation source with appropriate frequency divider circuits is used to generate the modulation frequency signals $f_1$ and $f_2$, and this oscillator in turn is employed as the source of clock pulses for driving the digital comparator circuit, thus eliminating any spurious phase shift or error signals produced in the ranging system itself. As the transmitted optical radiation is amplitude modulated, the phase shift produced between the transmitted and received signals due to the time required for propagation will be represented in the phase shift produced in the received SSB modulated signal and, most importantly, will be independent of the reflection characteristics of the log surface on which the beam is incident. In elaboration of this latter point, it is well known that the characteristics of a reflecting surface may itself introduce a variable and indeterminate phase shift in a reflected light radiation signal. In order to eliminate any distortion in the measurement of the time delay of propagation due to this factor, which could well introduce serious errors in the measurement of the time delay $\Delta t$, amplitude modulation of the light beam is employed so that any phase shift introduced in the reflected light signal is ignored, as the phase shift which is measured in the phase detection circuit is that of the SSB modulation envelope of the received wave which is not materially affected by the reflectivity characteristics of the surface against which the light beam is incident.

In order to eliminate any drift effects due to temperature changes or aging of the components employed in the system, the measurements of phase shift in the distance measuring means is calibrated against a reference target of similar reflective characteristics positioned at a known location relative to the light source.

In determining the phase shift between the transmitted and received signals in the digital comparator circuit of the phase detection system, the procedure employed is to open a gate to allow clock pulses to be accumulated in a counter for a length of time corresponding to the spacing between the respective modulation envelopes of the two wave forms. In order to improve the signal-to-noise ratio of the phase detection system, and improve the accuracy of the count, multiple readings are taken at each measurement point on the periphery of the log surface by repeating the counting a plurality of times, and then taking the average of the resultant counts.

Thereafter, utilizing predetermined information concerning the spacing of the light source from the spin axis of the charger mechanism holding the log while it rotated in front of the light source, and the correspondence between the measured points on the log surface and the increments of angular rotation of the log, it is possible by straightforward mathematical operations to determine the surface contour of the log for each of the spaced locations along the length of the log. From this information, which is representative of the overall surface configuration of the log, the optimum spin axis, corresponding to the center of rotation of the largest right cylinder which can be included within the log body, can be determined by computational techniques in an electronic data processor, and this information supplied on an on-line basis to a charger mechanism of conventional design so as to control the transfer of the log into the chucks of a veneer lathe in a manner so as to align the optimum spin axis of the log with the center axis of rotation of the lathe.

It is therefore a principal objective of the present invention to provide a novel and improved method and apparatus for determining the surface configuration of an elongate object such as a log.

It is a particular objective of the present invention to provide a novel method and apparatus for determining, in conjunction with optical ranging means and a computer, the configuration of an elongate object such as a log by measuring its surface contour at a number of spaced locations along its length as the object is rotated about a longitudinal axis.

And it is still a further objective of the present invention to provide a novel method and apparatus for determining the surface contour of a log and utilizing such information to determine the optimum spin axis when the log is rotated in a veneer lathe for maximizing the yield of usable veneer therefrom.

It is an important advantage of the present invention to provide an on-line method and apparatus for determining the surface configuration of a log, and the location of its optimum spin axis, in the short time interval between when a log is picked up by a charger mechanism and delivered into the chucks of a veneer lathe for peeling, so that the orientation of the arms of the charger mechanism can be automatically adjusted in response to such measurements and calculations for aligning the log in the lathe in a manner such that it will be rotated about said optimum spin axis.

It is another important advantage of the present invention to provide a method and apparatus for more accurately determining the optimum spin axis of a log so as to significantly increase the yield of usable veneer therefrom when the log is peeled in a veneer lathe.

The foregoing and other objectives, features and advantages of the present invention will be more readily understood upon consideration of the following detailed description of the invention, taken in conjunction with the accompanying drawings.

BRIEF DESCRIPTION OF THE DRAWINGS

FIG. 3 is a functional block diagram of the transceiver portion of the preferred embodiment of the ranging system utilized in the present invention.

DETAILED DESCRIPTION OF THE INVENTION

Figure 1:
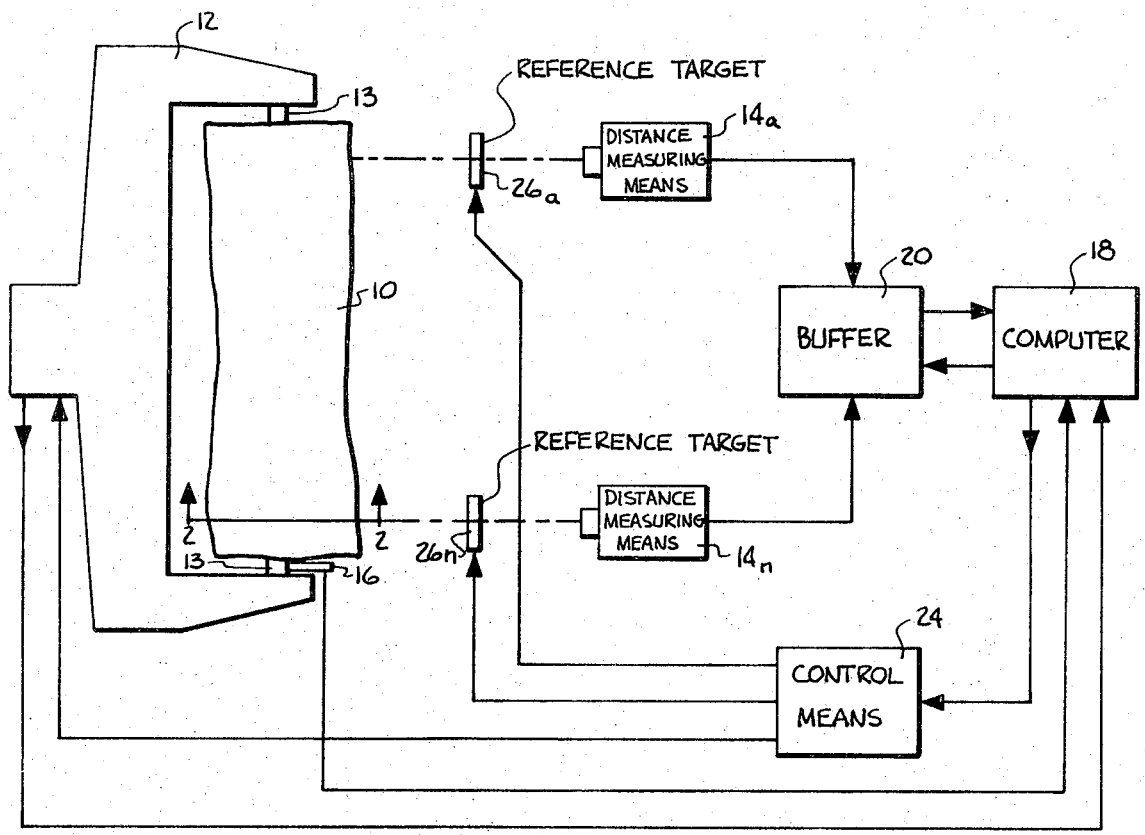
FIG. 1 is a top, partially schematic view of an embodiment of the present invention for determining the configuration of the log by measuring its surface contour at a number of spaced locations along the length of the log and, from such measurements, determining the optimum spin axis thereof for the peeling of the log in a veneer lathe.
Figure 2:
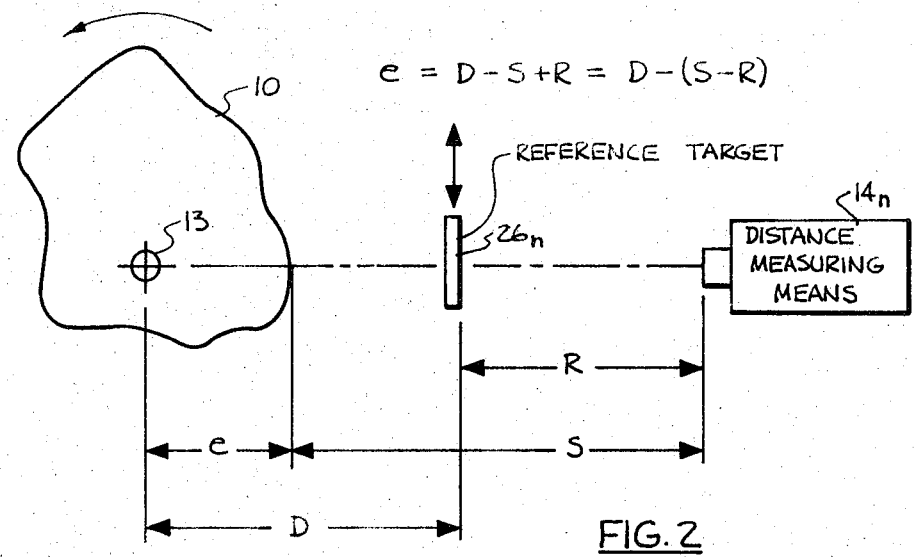
FIG. 2 is an enlarged sectional view, along the line 2—2 in FIG. 1, showing certain geometrical relationships utilized in the electro-optical ranging system incorporated as part of the present invention.

Referring now to the drawings, and initially FIGS. 1 and 2 thereof, there is shown an apparatus for determining the surface configuration of a log, designated as 10, while it is held between the spindle arms 13 of a charger mechanism 12 and rotated thereon, so as to determine the optimum spin axis of the log when it is delivered into the chucks of a veneer lathe for peeling for the purpose of maximizing the yield of veneer therefrom. The apparatus includes a plurality of distance measuring means 14a ... 14n spaced along the length of the log, with four typically being utilized for a nominal 8-foot long log block.

Each of the distance measuring means 14a ... 14n comprises an electro-optical ranging device for determining the circumferential contour of the log at a respective cross-sectional location. An individual distance measuring means 14n comprises, in a preferred embodiment, an infrared transceiver which radiates a modulated continuous wave beam of infrared energy that is reflected from a point on the log surface. The reflected light energy is processed in the transceiver by a digital phase comparator and logic circuit hereinafter described to determine the range (that is, the distance from the transceiver to the target point on the log surface) to a high degree of accuracy. As long as the log is rotated by the charger mechanism 12, the respective distance measuring means determines, for its cross-sectional location, the position in space of points on the log surface which are spaced about the circumference of the log. Twenty-four equally spaced measurements (i.e., every 15°) would typically be sufficient to accurately describe the surface contour of a log cross-section for purposes of determining the center of the largest circle which could be included therein and thus the location of the optimum spin axis for the log.

In order to determine the points about the log circumference at which the measurements are to be taken, a shaft encoder 16 is mounted on one of the charger spindle arms 13 to provide readings of the angular rotation of the log, and these readings are then utililzed to determine the angular increments at which measurements taken by the distance measuring means are supplied to the central data processor or computer 18 which may be a programmable general purpose mini-computer known to the art, of suitable speed and memory core capacity for this on-line process application, such as the Interdata Model 70 manufactured by Interdata, Inc. of Oceanport, N.J. In addition to the readings of angular position provided by the shaft encoder 16, the computer is supplied with data from the charger mechanism pertaining to the coordinate position of the axis of the spindle arms 13 about which the log is rotated while the measurements of its surface contours are being taken by the respective distance measuring means 14a ... 14n. The readings generated by the respective distance measuring means are supplied to a buffer 20 which stores this data and supplies it to the computer on demand.

In a typical configuration each of the respective distance measuring means 14n would continuously provide data to its associated buffer channel on the distance S to the log surface as the log is rotated, and this data would be supplied to the computer on a periodic basis corresponding to predetermined angular increments of log rotation. Data received from the buffer channels corresponding to the respective distance measuring means 14a ... 14n is processed by the computer 18 to determine, first, the surface contour of the log at each of the respective cross-sectional locations, and from that information the size of the largest right cylinder which can be included in the log volume is next determined, then the position of the center axis of the calculated right cylinder is determined (corresponding to the optimum spin axis). Thereupon through the medium of the control means 24 adjusting the coordinate orientation of the spindles 13 of the charger mechanism in response to output signals from the computer, the log is delivered into the chucks of the veneer lathe positioned in a manner so that it will be rotated about said optimum spin axis. The control means 24, in response to signals received from the computer 18, also functions to interject into the path of the light beam transmitted from the respective distance measuring means 14n an associated reference target 26n having reflectivity characteristics similar to that of the log surface on which the readings of the distance measuring means can be calibrated. The use of the reference target 26 eliminates the effects of long term drift in component operating parameters in the distance measuring system due to temperature changes and ageing. In the absence of compensation for such effects, it would not be possible to measure the surface configuration of the log to a sufficient resolution to produce a determination of the optimum spin axis for the log to the ±0.1 inch accuracy needed for efficient log utilization.

FIG. 2 illustrates the geometrical relationships pertaining in the calculation of the cross-sectional surface contours of the log from the measurements taken by the respective distance measuring means 14n. For each surface point spaced about the circumference of the log cross-section it is desired to determine the distance $e$ from the center axis of the charger spindle arms 13 to the surface point at which the light beam is incident. In an exemplary operation of the optical ranging system the associated reference target 26n, for each of the respective cross-sectional locations, would be interposed in the path of the light beam at the start of the measurement cycle. From previous calibration and setup of the apparatus, the distance $R$ from the distance measuring means to the reflective surface of the associated reference target would be known for each of the locations, as well as the distance $D$ from the surface of the reference target to the center axis of the spindle arms 13 when the charger is positioned for rotation of the log.

The control means 24, either automatically under control of the computer 18 or under manual command of an operator, would then start the sequence of operations by having the arms 13 of the charger mechanism grip the two ends of the next log to be processed by the veneer lathe and position it so that its spin axis as determined by the spindle arms is in line with the distance measuring means 14 and at a known fixed distance, $D + R$, from it. With the log in position, and with the reference target 26n still interposed in the path of the light beam, the data developed by the associated distance measuring means 14n on the distance $R$ of its respective reference target is supplied to the buffer 20 and thence to the computer 18 where the measured or indicated distance is compared with the known distance $R$ and corresponding compensating adjustments made, as necessary, so that the respective distance measuring means are calibrated immediately prior to the taking of readings on a new log.

When the calibration step is complete, the reference targets 26a ... 26n are removed out of the path of the light beams projected by the respective distance measuring means and the light beams incident on the log surface at the respective cross-sectional locations are reflected therefrom and received by the distance measuring means where calculations of the distance $S$, as determined by measurement of the phase shift between the transmitted and reflected light beams, is determined, for each cross-sectional location, at particular points on the log circumference corresponding to predetermined angular orientations of the log as indicated by the shaft encoder 16. From the readings of the distance $S$ provided by the distance measuring means 14n, the distance $e$ of a point on the log surface from the centerline of the spin axis of the log can be determined utilizing the formula $e = D - (S - R)$, and this information is then processed by the computer, for a number of points spaced about the circumference of the log for each respective cross-sectional location, as the log is rotated in front of the light beams of the distance measuring means. (The use of the reference target measurement $R$ in the calculation of the distance $e$ removes any error due to temperature changes and component drift in the distance measuring means. The error produced by such effects is independent of the distance measured; accordingly, by utilizing only the difference $(S - R)$ between the measured distance to the reference target and the measured distance to the surface of the log in calculating the distance $e$ from the spin axis to the log surface, this error is eliminated.) The computer calculates the distance $e$ from the spin axis of the charger to the log surface at each angular increment of the log rotation and for each of the cross-sectional locations along the longitudinal axis of the log at which the associated distance measuring means are positioned.

For any log cross-section, the center of the largest inscribed circle can be calculated by the computer based upon the measurements made by the respective distance measuring means from an arbitrary, but fixed reference point to various points along the circumference of the cross-section. These measurements describing each log cross-section can be expressed in polar coordinates terms $(r_i, \theta_i)$ relative to the reference point. Thus, in a respective log cross-section measurement for each angle of $\theta°$ (typically $\theta = 15°$, and there are 24 such measurements), the distance $r$ from the reference point to the log surface is specified, thereby yielding a set of measurements, $(r_i, \theta_i)$, $i = 1, n$, describing each cross-section.

An exact solution for the center of the largest inscribed circle, based upon the measurements $(r_i, \theta_i)$, can be determined in the following manner. Three points uniquely determine a circle; that is, there is only one circle which passes through any set of three distinct points. For each set of three measured points, the unique circle determined by them is computed. A test is made to see if any other pair of measured points lie in the interior of the circle. If this is the case, this circle is discarded as it is not contained within the log stem. If not other measured points lie in the interior of the circle, the circle center and radius values are saved. A different set of three points is then chosen and the process is repeated. After all combinations of three measured points have been evaluated, a comparison on all inscribed circles is made to determine the largest one. This yields the exact center and radius of the largest circle contained within the measured set of $n$ points.

The basic difficulty with the aforedescribed exact solution method is the relatively large amount of computer time that is required if the number of measurements is large. For $n$ measured points, the number of different combinations of three distinct points is $$[n(n-1)(n-2)]/6$$

Thus, computer time increases as the third power of the number of log measurements. (Special testing can eliminate approximately one-half of the total possible combinations with very little computation.)

By a modification of the exact solution method excellent accuracy and rapid computational times can be achieved. This modification involves subdividing the total number $n$ of measurements into smaller subsets, typically three groups of eight equally spaced points for $n = 24$. The largest inscribed circle is determined based on each of the smaller subsets. The associated three limiting points that determine each largest circle are noted. The total set of limiting points for all subsets is then used to compute the center point of the largest inscribed circle.

Utilizing the measured data on the log surface contours and the calculated center points of the largest circles which can be inscribed therein, the computer calculates a new spin axis for the log that will coincide with the centerline of the largest right cylinder which can be enclosed within the log volume. The log is then delivered to the chucks of the veneer lathe repositioned so as to rotate about the calculated optimum spin axis and thereby maximize the amount of veneer obtainable therefrom when the log is peeled.

Figure 3:
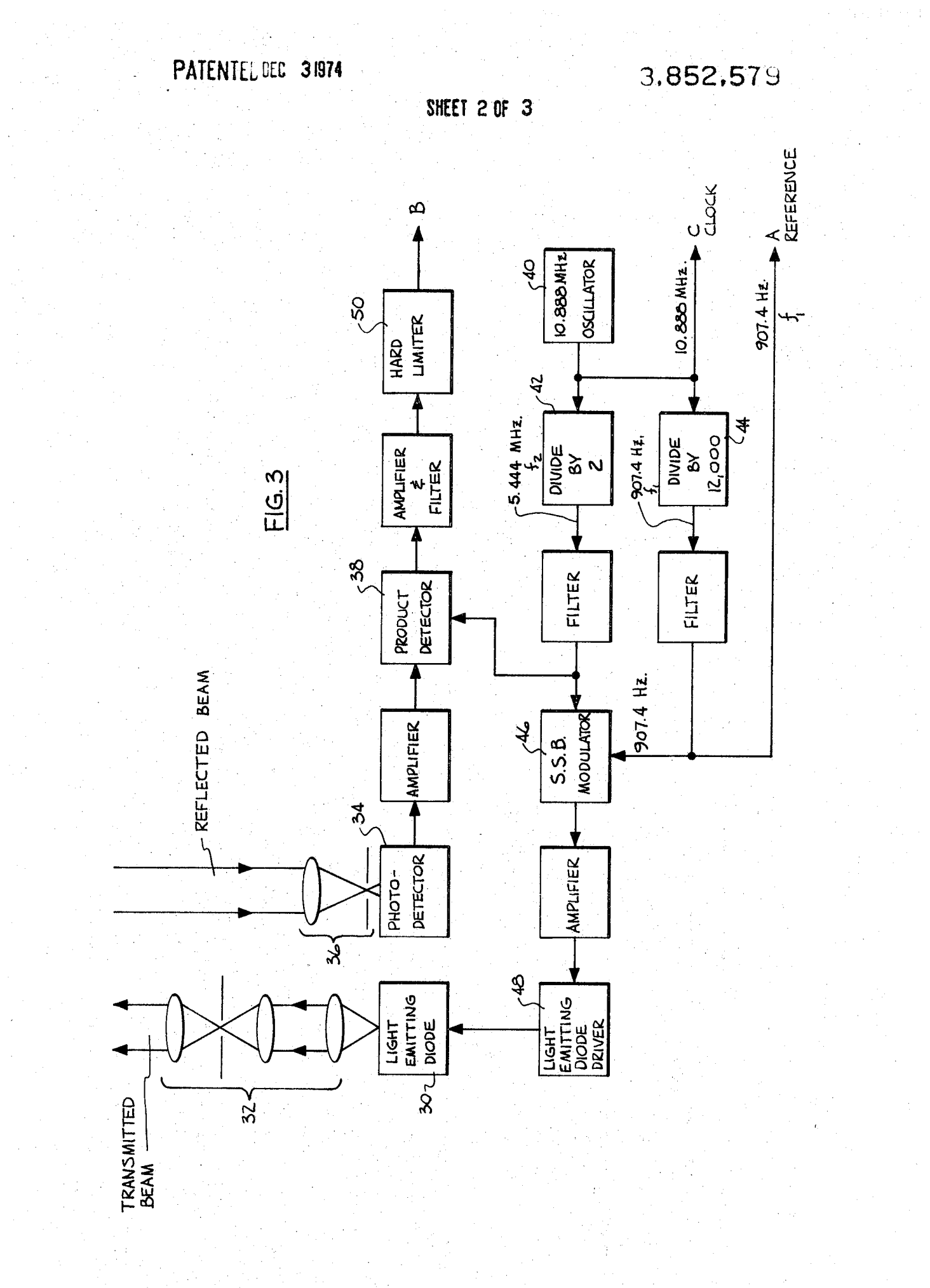

Turning now to FIG. 3, there is shown a functional block diagram of the transceiver portion of the electro-optical ranging system which is preferably employed for the distance measuring means 14n. The transmitter portion of the transceiver uses a light-emitting diode (LED) as a source of radiant light energy. An LED is preferred as the light source as it has the advantages of continuous wave operation at room temperature, low cost, ease of modulation and lacks sufficient coherence to constitute an eye radiation hazard. Range is determined by the distance measuring means through measurement of the time delay involved for the light signal to be propagated from the transceiver to a point on the log surface and return, the time delay $\Delta t$ being manifested as a phase shift between the transmitted and received signals.

The ranging system utilizes modulation of the infrared light beam for the purposes of discriminating against background radiation and providing a coherent reference for phase measurement. For facilitating the determination of the time delay in the propagation of the light signal between the transceiver and the log surface two modulating frequencies, differing by a ratio of about 6,000, are used. A lower frequency $f_1$ is used to modulate an upper frequency $f_2$ and obtain thereby the equivalent of a single sideband (SSB) output which is then used to amplitude modulate the transmitted infrared beam. Because the infrared beam is amplitude modulated, the phase shift between the transmitted and received signals will be present in the SSB signal and will be independent of the reflection characteristics of the log surface. This is important as it is known that the characteristics of a surface will, by itself, introduce a variable phase shift into a reflected light beam signal. In order to eliminate any distortion in the measurement of the time delay $\Delta t$ due to this factor, which would otherwise introduce serious errors in the measurement, amplitude modulation of the infrared beam is employed so that any phase shift introduced into the light beam signal on reflection is ignored, as the phase shift which is measured is that of the SSB modulation envelope which is not materially affected by the reflectivity characteristics of the target (log) surface.

The transceiver is comprised of a transmitter in the form of a light-emitting diode 30, together with a collimating lens system 32, for projecting a narrow-width light beam onto a target object, in this case a point on the surface of the log, and a receiver in the form of a photodetector 34 onto which the light beam reflected from the log surface is focused by a condensing lens and aperture 36. The LED transmitter projects infrared light radiation which is not coherent, but does have a relatively narrow bandwidth in the IR spectrum, one suitable choice being a gallium arsenide LED which emits radiation of approximately 0.93 micron wavelength. The intensity of the radiation emitted by the LED is linearly variable in response to the magnitude of the biasing current supplied thereto, and thus it is feasible with such an LED to continuous wave modulate the light source in response to a signal current without need for special environmental conditions or complex modulation equipment.

In the phase detector employed in the ranging system of the present invention, a double amplitude modulation scheme is utilized which requires two highly stable and synchronous frequency sources $f_1$ and $f_2$. In addition, a source of high-frequency clock pulses is required in the digital phase comparison and logic unit. In the interests of both economy and providing synchronous frequency sources for these three frequency signals, a single crystal-controlled temperature stabilized oscillator 40, operating exemplarily at 10.888 MHz, is employed which, in conjunction with digital frequency dividers 42 and 44, generates as well both the lower and upper modulation frequencies $f_1 = 907.4$ Hz and $f_2 = 5.444$ MHz, respectively. Through the adoption of this expedient of utilizing a single oscillator, all of the frequencies utilized in the ranging system will have the same percentage stability and they will of course be synchronous, thus materially reducing the error inherent in the phase comparison circuitry.

In the operation of the transceiver, the lower frequency $f_1$ is supplied to the modulator 46 to single sideband modulate the upper frequency signal $f_2$. After amplification, the SSB modulated electrical signal is supplied to a driver 48 for modulating the intensity of the LED 30 producing the transmitted light beam. The received signal, carried on the reflected beam and detected by photodetector 34, is amplified and then mixed down in product detector 38 with the upper modulation frequency $f_2$ to yield the demodulated detected signal B at the lower modulation frequency $f_1$. The phase of the demodulated detected signal B is shifted with respect to the reference signal A, also at the lower modulation frequency $f_1$, in an amount proportional to the distance $S$ from the light source to the reflective target point on the log surface. Before this phase shift is determined in the digital phase comparator and logic unit, signal B is processed by hard limiter 50 to configure it into a pulse-shaped waveform, thereby improving its signal-to-noise ratio and minimizing the effects of changing signal strength.

Figure 4:
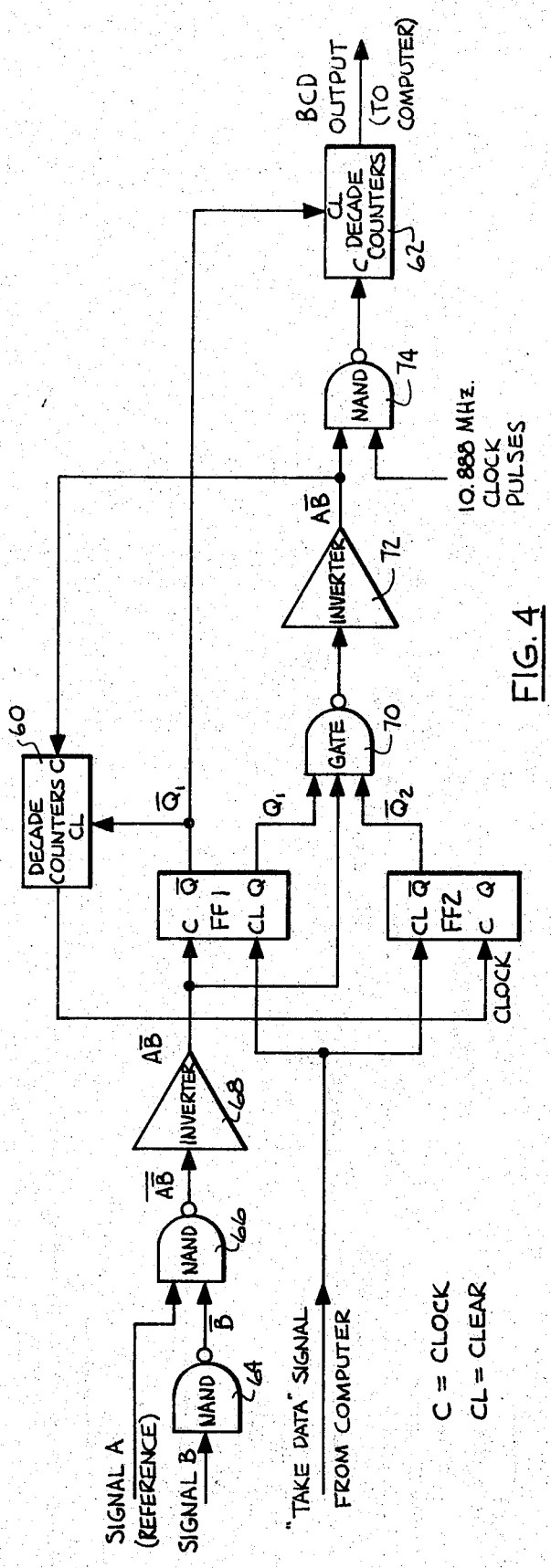
FIG. 4 is a schematic diagram of the phase detector portion of the ranging system.
Figure 5:
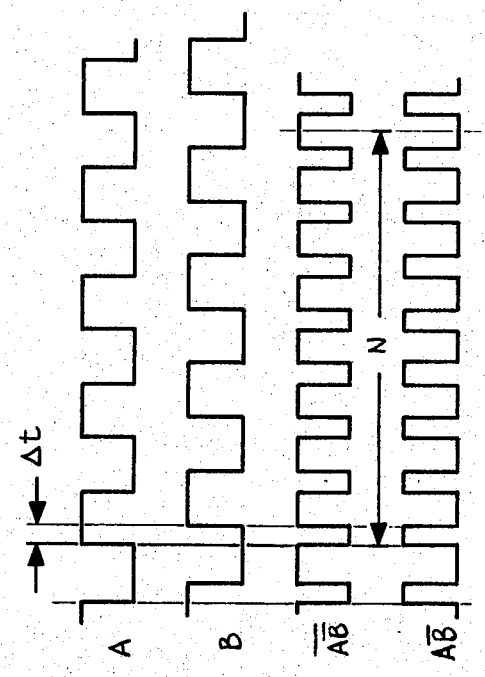
FIG. 5 is a series of pulse waveforms on a common time scale illustrating certain relationships between signals present at various points in the phase detector circuit of FIG. 4.

The phase comparison and logic circuitry of the ranging system is shown in FIG. 4. Its purpose is to measure the time delay $\Delta t$ (depicted in the waveforms of FIG. 5) between the lower frequency signal B and the reference lower frequency signal A which time difference in turn is representative of the phase shift between the received and transmitted signals propagated by the light beam. By way of illustration of the inherent fine resolution possessed by the ranging system of the present invention, a change of 0.25 cm in the location of the target object, equivalent to a change in the distance traveled by the propagated and reflected light beam of about 0.5 cm, would result in a change in time delay $\Delta t$ of 16.7 picoseconds. In a cycle of the upper modulation frequency $f_2$ of 5.444 MHz such a change would be equivalent to a phase shift of only 91 parts in a million. However, through the utilization of the two-frequency modulation scheme, an enhancement in the time delay between the transmitted and reflected signals A and B by a factor of $f_2/f_1$ or 6,000 is obtained, thus producing a time delay of approximately 0.1 microsecond at 907.4 Hz which is readily discernible with the digital comparator circuitry hereinafter described. In the interests of accuracy, a plurality of measurements of the time delay $\Delta t$ are taken at each measurement point on the surface of the target object, and the results of such measurements are averaged by the logic circuitry to produce a pulse count representative of the distance $S$ between the ranging system and the target.

Prior to taking a measurement, the two J-K flip-flops $FF_1$ and $FF_2$ are cleared by a "take data" signal from the computer 18. When $FF_1$ clears, its $\overline{Q}_1$ output clears the two sets of decade counters 60 and 62 rendering the phase detector circuitry ready to determine the time delay $\Delta t$ existing between the pulse-shaped signals A and B. NAND gates 64 and 66, in conjunction with inverter 68, combine to generate a pulse $A\overline{B}$ having a frequency rate at the lower modulation frequency $f_1$ (=907.4 Hz).

Starting at the point when the flip-flops $FF_1$ and $FF_2$ are cleared by the "take data" signal from the computer, the $Q_1$ output of $FF_1$ is a 0 and the $\overline{Q}_2$ output of $FF_2$ is a 1. The first pulse in the train $A\overline{B}$ that is outputted from the inverter 68, after the circuit has been cleared, will clock flip-flop $FF_1$ on the falling edge of the pulse causing $Q_1$ to change to a 1. With both $Q_1$ and $\overline{Q}_2$ in a 1 state, gate 70 is enabled and will now follow, in inverted fashion, the output from the inverter 68. The next pulse and succeeding pulses in the train $A\overline{B}$ will pass through gate 70 until it is shut off by a change in the state of the signal $\overline{Q}_2$ received from flip-flop $FF_2$. The output from gate 70 is inverted by element 72 and then supplied as count pulses to a first decade counter set 60. This counter can be preset to count any number $N$ of count pulses before an output is produced from the counter. This preset number $N$ is the quantity of samples taken that is averaged in the logic circuit to obtain a measurement of the time delay $\Delta t_{avg}$ which has an improved signal-to-noise ratio.

The output of the first decade counter 60 is used as a "clock" pulse for driving flip-flop $FF_2$. When $FF_2$ changes state, $\overline{Q}_2$ changes from a 1 to a 0 and this closes gate 70. The net effect of the circuitry thus described is to generate a train of $N$ pulses whose pulse width is equal to the time delay $\Delta t$ existing between signals A and B. Thus sequence of N pulses $\overline{AB}$ supplied from gate 70 through inverter 72 is applied as an enabling signal to NAND gate 74 to allow the 10.888 MHz clock pulses provided by the oscillator 40 to pass through to the second decade counter 62. During the time each pulse in train $N$ is present at NAND gate 74, the 10.888 MHz clock pulses pass through and are accumulated in counter 62. At the end of pulse train $N$, the number of clock pulses then accumulated in the counter corresponds to the sum of the time delays between signals A and B for $N$ cycles of the received signal B in terms of the period of the 10.888 MHz clock. The average time delay $\Delta t_{avg}$ is then obtained in seconds by dividing the indicated number of counts stored in counter 62 both by the number $N$ of samples taken and the clock frequency of 10.888 MHz. Counter 62 has a binary coded decimal (BCD) output that is buffered and then fed to the computer 18 where the necessary computations are performed to arrive at an average time delay $\Delta t$ which is representative of the distance $S$ from the light source of the distance measuring means to the reflective target surface.

Since the 10.888 MHz clock pulse source 40 and the reference signal A derived therefrom are synchronous, NAND gate 74 is always open in synchronism with the clock pulses and thus no spurious counts are gained or lost in the counter 62 which might otherwise be the case if the opening of the gate were random in the cycle of the clock pulses. However, the closing of gate 74, as determined by an output from the first decade counter 60, is random, and therefore a count in the counter 62 may, on occasion, be gained or lost. This randomness in the closing of gate 74 introduces a maximum error per sampling of $N$ readings of ± one count, but this is a marked improvement over the ± two counts error typically encountered in conventional digital differential time measurement circuits in which both the opening and closing of the pulse counter are random in the cycle of clock pulses.

From the data supplied by each of the distance measuring means 14a . . . 14n similar to the one just described, in conjunction with the signals provided by the shaft encoder 16 and the previously stored information concerning the location of the reference target 26n and the charger mechanism 12, the computer 18 is able to formulate an accurate description of the surface configuration of the log and from that calculate the centerline of the largest right cylinder which can be included therein. Thereupon the computer, operating through the control means 24, causes the charger mechanism to reorient and adjust the position of its spindle arms 13 so as to deliver the log into the veneer lathe so as to be rotated about the calculated spin axis as hereinbefore described.

The terms and expressions which have been employed in the foregoing abstract and specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. An apparataus for determining the surface configuration of an elongate object, such as a log, comprising:

a. means for gripping said object by its respective ends and rotating it about a longitudinal axis;
    b. a plurality of distance measuring means spaced along the length of said object for scanning the circumferential contour of said object at said said respective spaced locations, while said object is being continuously rotated each of said distance measuring means comprising an optical ranging system in the form of a transceiver means for radiating light energy which is then reflected back from an opposed point on the surface of said object and processed by said transceiver to produce a data signal descriptive of said circumferential contour at said respective spaced location; and
    c. a computer for processing said data signals received from said plurality of distance measuring means to determine the surface configuration of said object.

2. The apparatus of claim 1 further including shaft encoder means coupled to said gripping means for providing further data signals to said computer concerning the angular rotation of said object as it is being scanned by said plurality of distance measuring means.

3. Apparatus according to claim 2 further including buffer means for receiving and storing temporarily said data signals from said respective distance measuring means and furnishing said data signals upon demand to said computer on a periodic basis corresponding to predetermined angular increments of rotation of said object as indicated by said further data signals from said shaft encoder means.

4. Apparatus for determining the optimum spin axis for a log which is to be turned in the chucks of a veneer lathe for the purpose of maximizing the yield of veneer therefrom, comprising:

a. a charger mechanism having a pair of arms for gripping a log by its ends and rotating it about a longitudinal axis thereof;
    b. a plurality of distance measuring means spaced along the length of said log for scanning the circumferential contour of said log at respective cross-sectional locations while said log is being continuously rotated, said distance measuring means each providing data signals describing said respective circumferential contours;
    c. a computer for receiving said data signals from said distance measuring means and calculating therefrom the position of the center axis of the largest right cylinder which can be included within the volume of said log; and
    d. control means for adjusting the coordinant orientation of the arms of said charger mechanism in response to output signals from said computer so that said log is delivered by said charger mechanism into the chucks of said veneer lathe positioned in a manner so that it will be rotated about said calculated right cylinder axis.

5. Apparatus according to claim 4 wherein said distance measuring means comprise transceiver means for radiating light energy which is reflected back from an opposed point on the surface of said log, and means for determining the time for propagation of said light energy from transmission to reception by said transceiver means which is indicative of the location of said point in space.

6. The apparatus of claim 5 further including shaft encoder means coupled to said gripping means for providing further data signals to said computer concerning the angular rotation of said log.

7. Apparatus according to claim 6 further including buffer means for receiving and storing temporarily said data signals from said respective distance measuring means and furnishing said data upon demand to said computer on a periodic basis corresponding to predetermined angular increments of rotation of said log as indicated by said further data signals from said shaft encoder means.

8. A method for determining the optimum spin axis for a log when rotated in a veneer lathe in order to maximize the yield of usable veneer therefrom comprising the steps of:
 a. gripping said log by its ends and rotating it about a longitudinal axis thereof;
 b. scanning preselected portions of the surface of said log while it is being continuously rotated to determine the approximate configuration thereof;
 c. determining the center axis of the largest right cylinder which can be included within the volume of said approximated log configuration; and
 d. delivering said log into the chucks of said veneer lathe positioned in a manner so that it will be rotated about said right cylinder axis.

9. The method of claim 8 wherein the step of scanning the surface of said log to determine its approximate configuration includes the measurement of the circumferential contour of said log at a plurality of locations spaced along the length thereof.

10. An apparatus for determining the approximate surface configuration of an elongate object, such as a log, comprising:
 a. means for gripping said object and rotating it about a longitudinal axis; and
 b. a plurality of distance measuring means spaced along the length of said object for scanning the circumferential contour of said object at respective spaced locations while said object is being continuously rotated, each of said distance measuring means comprising an electro-optical ranging system in the form of transceiver means for radiating light energy which is then reflected back from an opposed point on the surface of said object and processed by said transceiver to produce a data signal descriptive of said circumferential contour at said respective spaced location.

11. The apparatus of claim 10 further including shaft encoder means coupled to said gripping means for providing further data signals concerning the angular rotation of said object as it is being scanned by said plurality of distance measuring means.

12. Apparatus according to claim 11 further including buffer means for receiving and storing temporarily said data signals from said respective distance measuring means and furnishing output signals representative of said data signals on a periodic basis corresponding to predetermined angular increments of rotation of said object as indicated by said further data signal from said shaft encoder means.

13. A method for determining the approximate surface configuration of an elongate object, such as a log, comprising:
 a. rotating said object about a longitudinal axis; and
 b. scanning with electro-optical transceiver means preselected portions of the surface of said object at a plurality of locations spaced along the length thereof, while said object is being continuously rotated, thereby to determine the circumferential surface contour of said object at said spaced locations.

* * * * *

UNITED STATES PATENT OFFICE
CERTIFICATE OF CORRECTION

Patent No. 3,852,579　　　　　　　　Dated December 3, 1974

Inventor(s) Fred Sohn, Larry C. Hunter and James Frederick Holmes

It is certified that error appears in the above-identified patent and that said Letters Patent are hereby corrected as shown below:

| | |
|---|---|
| Col. 1, Line 23 | Change "2,698,818" to --3,698,818-- |
| Col. 5, Line 54 | Change "utililzed" to --utilized--. |
| Col. 7, Line 53 | Change "mde" to --made--; |
| Line 57 | Change "coordinates" to --coordinate--. |
| Col. 12, Line 17 | Delete "said said"; |
| Line 18 | After "locations" delete the comma; |
| Line 19 | After "rotated" insert a comma; |
| Line 63 | Change "coordinant" to --coordinate--. |

Signed and sealed this 18th day of February 1975.

(SEAL)
Attest:

RUTH C. MASON
Attesting Officer

C. MARSHALL DANN
Commissioner of Patents
and Trademarks